(12) United States Patent
Rosenberg

(10) Patent No.: US 9,171,325 B2
(45) Date of Patent: *Oct. 27, 2015

(54) CROSS CHANNEL DELIVERY SYSTEM AND METHOD

(71) Applicant: Music Choice, Horsham, PA (US)

(72) Inventor: Jeremy C. Rosenberg, Havre de Grace, MD (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,358

(22) Filed: Dec. 10, 2012

(65) Prior Publication Data

US 2013/0198034 A1    Aug. 1, 2013

Related U.S. Application Data

(63) Continuation of application No. 11/842,375, filed on Aug. 21, 2007, now Pat. No. 8,332,276, which is a continuation of application No. 10/991,863, filed on Nov. 19, 2004, now Pat. No. 7,346,558, which is a continuation of application No. 09/547,846, filed on Apr. 12, 2000, now Pat. No. 6,879,963.

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0601* (2013.01); *G06Q 30/0253* (2013.01); *G06Q 30/06* (2013.01);
(Continued)

(58) Field of Classification Search
CPC .......................................... G06Q 30/00–30/08

USPC ............................................... 705/26.1–27.2
See application file for complete search history.

(56) References Cited

U.S. PATENT DOCUMENTS

4,127,796 A    11/1978 Henderson
4,336,478 A    6/1982 Quilty et al.
(Continued)

FOREIGN PATENT DOCUMENTS

EP    1 022 900    7/2000
WO    WO9737492    10/1997
(Continued)

OTHER PUBLICATIONS

"HP-UX AAA Server A.06.00 Getting Started Guide" HP-UX 11.0, 11i v1, Hewlett-Packard Company, 69 pages, (dated 2003).
(Continued)

*Primary Examiner* — Michael Misiaszek
(74) *Attorney, Agent, or Firm* — Rothwell, Figg, Ernst & Manbeck, P.C.

(57) ABSTRACT

Methods and systems consistent with the present invention provide a cross channel fulfillment system that enables consumers to purchase and receive items using different transmission mediums. The fulfillment system is a centralized distribution system that maintains information relating to consumers and has access to multiple transmission mediums. Specifically, the fulfillment system contains a database of consumer contact information relating to each transmission medium. The fulfillment system uses a remote device to provide information to consumers. The remote device transmits and receives broadcast messages including information relating to purchasable items. The fulfillment system may deliver a purchased item to the consumer using a medium different from that used to purchase the item.

20 Claims, 7 Drawing Sheets

(52) U.S. Cl.
CPC ........ *G06Q30/0633* (2013.01); *G06Q 30/0635* (2013.01); *G06Q 30/0637* (2013.01); *G06Q 30/0641* (2013.01)

(56) References Cited

U.S. PATENT DOCUMENTS

| | | | |
|---|---|---|---|
| 4,338,623 A | 7/1982 | Asmus et al. | |
| 4,360,805 A | 11/1982 | Andrews et al. | |
| 4,677,430 A | 6/1987 | Falkman et al. | |
| 4,722,005 A | 1/1988 | Ledenbach | |
| 4,760,455 A | 7/1988 | Nagashima | |
| 4,799,156 A | 1/1989 | Shavit et al. | |
| 5,130,615 A | 7/1992 | George | |
| 5,193,006 A | 3/1993 | Yamazaki | |
| 5,341,350 A | 8/1994 | Frank et al. | |
| 5,355,302 A | 10/1994 | Martin et al. | |
| 5,365,381 A | 11/1994 | Scheffler | |
| 5,371,551 A | 12/1994 | Logan et al. | |
| 5,418,654 A | 5/1995 | Scheffler | |
| 5,481,296 A | 1/1996 | Cragun et al. | |
| 5,534,911 A | 7/1996 | Levitan | |
| 5,550,863 A | 8/1996 | Yurt et al. | |
| 5,557,541 A | 9/1996 | Schulhof et al. | |
| 5,572,442 A | 11/1996 | Schulhof et al. | |
| 5,585,866 A | 12/1996 | Miller et al. | |
| 5,590,282 A | 12/1996 | Clynes | |
| 5,592,511 A | 1/1997 | Schoen et al. | |
| 5,616,876 A | 4/1997 | Cluts | |
| 5,617,565 A | 4/1997 | Augenbraun et al. | |
| 5,629,867 A | 5/1997 | Goldman | |
| 5,635,989 A | 6/1997 | Rothmuller | |
| 5,636,276 A | 6/1997 | Brugger | |
| 5,675,734 A | 10/1997 | Hair | |
| 5,708,780 A | 1/1998 | Levergood et al. | |
| 5,721,815 A | 2/1998 | Ottesen et al. | |
| 5,726,909 A | 3/1998 | Krikorian | |
| 5,734,719 A | 3/1998 | Tsevdos et al. | |
| 5,734,961 A | 3/1998 | Castille | |
| 5,751,282 A | 5/1998 | Girard et al. | |
| 5,753,844 A | 5/1998 | Matsumoto | |
| 5,754,939 A | 5/1998 | Herz et al. | |
| 5,761,606 A | 6/1998 | Wolzien | |
| 5,761,607 A | 6/1998 | Gudesen | |
| 5,761,662 A | 6/1998 | Dasan | |
| 5,781,889 A | 7/1998 | Martin et al. | |
| 5,784,095 A | 7/1998 | Robbins et al. | |
| 5,790,935 A | 8/1998 | Payton | |
| 5,793,980 A | 8/1998 | Glaser et al. | |
| 5,809,144 A | 9/1998 | Sirbu et al. | |
| 5,809,246 A | 9/1998 | Goldman | |
| 5,819,049 A | 10/1998 | Reietmann | |
| 5,819,160 A | 10/1998 | Foladare et al. | |
| 5,835,487 A | 11/1998 | Campanella | |
| 5,841,979 A | 11/1998 | Schulhof et al. | |
| 5,848,398 A | 12/1998 | Martin et al. | |
| 5,861,906 A | 1/1999 | Dunn et al. | |
| 5,878,141 A | 3/1999 | Daly et al. | |
| 5,890,137 A | 3/1999 | Koreeda | |
| 5,890,139 A | 3/1999 | Suzuki et al. | |
| 5,899,699 A | 5/1999 | Kamiya | |
| 5,899,980 A | 5/1999 | Wilf et al. | |
| 5,900,830 A | 5/1999 | Scheffler | |
| 5,918,213 A | 6/1999 | Bernard et al. | |
| 5,926,624 A | 7/1999 | Katz et al. | |
| 5,930,765 A | 7/1999 | Martin et al. | |
| 5,930,768 A | 7/1999 | Hooban | |
| 5,931,901 A | 8/1999 | Wolfe et al. | |
| 5,933,500 A | 8/1999 | Blatter et al. | |
| 5,943,422 A | 8/1999 | Van Wie et al. | |
| 5,944,608 A | 8/1999 | Reed et al. | |
| 5,959,945 A | 9/1999 | Kleiman | |
| 5,960,411 A | 9/1999 | Hartman et al. | |
| 5,968,120 A | 10/1999 | Guedalia | |
| 5,969,283 A | 10/1999 | Looney et al. | |
| 5,970,474 A | 10/1999 | LeRoy et al. | |
| 5,973,722 A | 10/1999 | Wakai et al. | |
| 5,980,261 A | 11/1999 | Mino et al. | |
| 5,986,692 A | 11/1999 | Logan et al. | |
| 5,991,374 A | 11/1999 | Hazenfield | |
| 5,991,737 A | 11/1999 | Chen | |
| 6,011,761 A | 1/2000 | Inoue | |
| 6,011,854 A | 1/2000 | Van Ryzin | |
| 6,021,432 A | 2/2000 | Sizer et al. | |
| 6,025,868 A | 2/2000 | Russo | |
| 6,038,591 A | 3/2000 | Wolfe et al. | |
| 6,055,314 A | 4/2000 | Spies et al. | |
| 6,055,566 A | 4/2000 | Kikinis | |
| 6,085,235 A | 7/2000 | Clarke et al. | |
| 6,088,455 A | 7/2000 | Logan et al. | |
| 6,088,722 A | 7/2000 | Herz et al. | |
| 6,105,060 A | 8/2000 | Rothblatt | |
| 6,135,646 A | 10/2000 | Kahn et al. | |
| 6,151,634 A | 11/2000 | Glaser et al. | |
| 6,154,772 A | 11/2000 | Dunn et al. | |
| 6,161,142 A | 12/2000 | Wolfe et al. | |
| 6,192,340 B1 | 2/2001 | Abecassis | |
| 6,223,292 B1 | 4/2001 | Dean et al. | |
| 6,226,030 B1 | 5/2001 | Harvey et al. | |
| 6,226,618 B1 | 5/2001 | Downs et al. | |
| 6,229,895 B1 | 5/2001 | Son et al. | |
| 6,232,539 B1 | 5/2001 | Looney et al. | |
| 6,233,682 B1 | 5/2001 | Fritsch | |
| 6,240,553 B1 | 5/2001 | Son et al. | |
| 6,243,725 B1 | 6/2001 | Hempleman et al. | |
| 6,246,672 B1 | 6/2001 | Lumelsky | |
| 6,249,281 B1 | 6/2001 | Chen et al. | |
| 6,249,810 B1 | 6/2001 | Kiraly | |
| 6,253,235 B1 | 6/2001 | Estes | |
| 6,253,237 B1 | 6/2001 | Story et al. | |
| 6,262,772 B1 | 7/2001 | Shen et al. | |
| 6,279,040 B1 | 8/2001 | Ma et al. | |
| 6,286,139 B1 | 9/2001 | Decinque | |
| 6,305,020 B1 | 10/2001 | Horaty et al. | |
| 6,324,217 B1 | 11/2001 | Gordon | |
| 6,330,595 B1 | 12/2001 | Ullman et al. | |
| 6,330,609 B1 | 12/2001 | Garofalakis et al. | |
| 6,490,728 B1 | 12/2002 | Kitazato et al. | |
| 6,502,194 B1 | 12/2002 | Berman et al. | |
| 6,507,727 B1 | 1/2003 | Henrick | |
| 6,792,280 B1 | 9/2004 | Hori et al. | |
| 7,149,471 B1 | 12/2006 | Arisawa et al. | |
| 7,165,044 B1 | 1/2007 | Chaffee | |
| 7,177,628 B2 | 2/2007 | Sommers et al. | |
| 7,424,446 B2 | 9/2008 | Emodi et al. | |
| 7,500,261 B1 | 3/2009 | Myers | |
| 2001/0042107 A1 | 11/2001 | Palm | |
| 2002/0023164 A1 | 2/2002 | Lahr | |
| 2002/0023166 A1 | 2/2002 | Bar-Noy et al. | |
| 2002/0032728 A1 | 3/2002 | Sako et al. | |
| 2002/0038359 A1 | 3/2002 | Ihara et al. | |
| 2002/0056117 A1 | 5/2002 | Hasegawa et al. | |
| 2002/0056118 A1 | 5/2002 | Hunter et al. | |
| 2002/0062261 A1 | 5/2002 | Mukai | |
| 2002/0078220 A1 | 6/2002 | Ryan | |
| 2002/0120939 A1 | 8/2002 | Wall et al. | |
| 2002/0194260 A1 | 12/2002 | Headley et al. | |
| 2002/0194619 A1 | 12/2002 | Chang et al. | |
| 2003/0050058 A1 | 3/2003 | Walsh | |
| 2003/0088687 A1 | 5/2003 | Begeja et al. | |
| 2003/0097338 A1 | 5/2003 | Mankovich et al. | 705/64 |
| 2006/0184431 A1 | 8/2006 | Rosenberg et al. | |

FOREIGN PATENT DOCUMENTS

| | | |
|---|---|---|
| WO | WO9917230 | 4/1999 |
| WO | WO9948296 | 9/1999 |
| WO | WO00/07368 | 2/2000 |
| WO | WO01/36064 | 5/2001 |
| WO | WO01/35874 | 11/2001 |

OTHER PUBLICATIONS

Office Action, U.S. Appl. No. 11/401,963, dated Feb. 17, 2011, 16 pages.

(56) References Cited

OTHER PUBLICATIONS

Office Action, U.S. Appl. No. 11/401,963, dated Sep. 2, 2010, 12 pages.
Office Action, U.S. Appl. No. 11/401,963, dated Mar. 18, 2010, 8 pages.
PCT International Search Report and Written Opinion from PCT/US06/13719 dated Aug. 16, 2007, 4 pp.
"Sonicbox brings Net radio into your living room" (Jeff Partyka, Oct. 12, 1999, CNN.com).
"Internet Radio Listeners Unchained From Their PCs" (Doug Olenick, Oct. 25, 1999, Twice Computer Technology).
"Sonicbox and Microsoft Windows Media Internet Radio to the home Stereo" (Dec. 7, 1999, Microsoft Press Release).
Tune on, Tune in, Drop Cash (Brad King, Dec. 8, 2000, Wired News).
"Global Media Announces Launch of Independent Internet Radio Station; Station Includes E-Commerce Point of Purchase for Music" (Feb. 1, 1999, Business Wire).
"Platinum Entertainment and Liquid Audio Join Forces to Offer Extensive Music Catalog via Digital Downloads" (Jul. 17, 1998, PR Newswire).
"Thinking Globally with a web-based radio station vying for listeners around the world, homegrown internet company fastband aims to shake up the music world" (LaFrance, Siona, Nov. 4, 1999, Times).
"Tune into Yahoo! Radio; Yahoo! Teams up with Broadcast.com and Spinner.com to Provide 10 Stations to Audio programming " (May 11, 1999, Business Wire).
"Set-top box for television that reads your mind" Taylor, Paul, Dec. 30, 1998, Financial Times; London.
Yahoo! Offers One-stop shop for e-music (Aug. 25, 1999, Milwaukee Journal Sentinel).
Yahoo! Press Release.
WebRadio.com Signs on as Liquid Music Network Affiliate Offering Liquid Audio Digital Downloads: (Sep. 1, 1999, Business Wire).
"Blue Note Radio: Now Playing on a Computer Screen Near You, EMI's Blue Note Records Expands New Media initiative with RadioWave.com" (Apr. 4, 2000, PR Newswire).
H. Rajapakshe et al., "Video on Demand", Jun. 1995, pp. 1-15.
Audio Request, MP3 Home Stereo Jukebox, ReQuest, Inc.—Company Info., and NSI-WHOIS Search Results, Pages from the web site for www.request.com owned by ReQuest, Inc.
D. Clark, (2000), "Click Radio to put a DJ in your PC.", WSJ Interactive Edition.
ClickRadio granted first interactive radio license by universal music group, 3 pages, From the web site at www.clickradio.com, printed Apr. 26, 2000.
C. Gordon, (2000), "Click radio sidesteps competition with music licensing deals", Atnewyork.com.
Press Release, (Dec. 13, 2000), "Phillips showcases click radio on digital set-top at western show 2000", Phillips.
Six pages from the web site for www.sonicnet.com.
Ntl: Digital Radio.http://www.ntl.com/locales/gb/en/guides/dummies/produce.asp.
Bower (1998), "Digital Radio—A Revolution for In-Car Entertainment", Proc. NavPos Automative '98 Conf. 2(5-8): 40-51.
Deutsche Telekom AG: Digital Radio. http://www.telekom.de/dtaq/ipll/cda/level3 a/0,3680,10077,00.html.
The Eureka 147 Consortium, "Digital Audio Broadcasting" http://www.eureadab.org/eureka 147 consortium.htm.
Radio Authority (1999), Digital Radio Fact Sheet No. 4 http://www.radioauthority.org.uk/Information/Fact Sheets/fs4.htm.
ICTV (2000), Digital Broadband System Press Release: 1-11. Launch.com.
G. Welz, "Integrated Streaming Technologies", Oct. 30, 1996, pp. 1-3.
"ClickRadio to Start Digital Music Service," Don Clark, The Wall Street Journal, Apr. 20, 2000. (provided in parent case).

CROSS CHANNEL DELIVERY SYSTEM AND METHOD

This application is a continuation of U.S. patent application Ser. No. 11/842,375, filed Aug. 21, 2007 (which will issue as U.S. Pat. No. 8,332,276 on Dec. 11, 2012), which is a continuation of U.S. patent application Ser. No. 10/991,863, filed on Nov. 19, 2004 (now U.S. Pat. No. 7,346,558), which is a continuation of U.S. patent application Ser. No. 09/547,846, filed on Apr. 12, 2000 (now U.S. Pat. No. 6,879,963). The above identified applications and patents are incorporated by reference herein.

BACKGROUND OF THE INVENTION

1. Field of the Invention

This invention relates generally to data processing systems and, more particularly, to electronic delivery systems.

2. Description of the Related Art

The world is quickly becoming wired. Nearly all households and businesses both have telephone and cable access. Now, more that ever, consumers may choose from a plurality of transmission mediums to access the Internet, such as cable, telephone, satellite, or some other high speed connection. As more consumers gain access to the Internet though a multitude of available transmission mediums, things previously done in the real world are now available through the Internet using at least one of the transmission mediums.

Probably the most commercialized use of the Internet is the World Wide Web. Every day, more people gain access to the Web, and every day, people are using the Web to shop online. Online shopping provides a level of convenience consumers want, need and will soon demand. Electronic commerce or "e-commerce" is the term often used to refer, at least in part, to online shopping on the Web.

With the explosive growth of online shopping on the Internet, the need for online delivery of digital items has also considerably grown. Online delivery refers to delivery of electronic items using an electronic format in any transmission medium. For example, a book, movie, or even a single track from a CD may be delivered to a consumer as a digital item. Consumers desire these digital items delivered immediately in a format suitable for viewing or playback using a consumer device, such as a computer. With the number of online stores that provide digital delivery growing exponentially every year, consumer devices capable of ordering, receiving, and viewing have also become more prevalent.

For example, WebTV, a popular Internet consumer device, is capable of ordering, and receiving digital items using more than one transmission medium. That is, the WebTV device provides access to the Internet as well as access to a conventional TV. Although the WebTV device enables consumers to use multiple transmission mediums using the same device, it does so at the expense of limited upgradeability. A consumer cannot specify a new transmission medium for delivery, unless the WebTV device supports the transmission medium. Even more so, any cross coupling of transmission mediums is provided at the WebTV device. And, in most instances, when shopping online using the WebTV device, the consumer initiates the shopping session by visiting a site. Only at that time, may the consumer then select an item to purchase, and then have the item delivered to the WebTV device.

Therefore, there is a need for a system capable of centralizing the cross coupling of transmission mediums with limited configuration requirements at a consumer's location. Such a system not only permits a consumer to shop online using one transmission medium and receive a purchased item using a different transmission medium, but also it permits easy upgrades, or the addition of new transmission mediums without having to modify any consumer device.

SUMMARY OF THE INVENTION

Methods and systems consistent with the present invention provide a cross channel fulfillment system that enables consumers to purchase and receive items using different transmission mediums. The fulfillment system is a centralized distribution system that maintains information relating to consumers and has access to multiple transmission mediums. Specifically, the fulfillment system contains a database of consumer contact information relating to each transmission medium. The fulfillment system uses a remote device to provide information to consumers. The remote device transmits and receives broadcast messages including information relating to purchasable items. The fulfillment system may deliver a purchased item to the consumer using a medium different from that used to purchase the item.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Methods and systems consistent with the present invention provide a cross channel fulfillment and delivery system that transmits and receives information relating to purchasable items to and from consumers using multiple transmission mediums. Such methods and systems enable consumers to automatically and electronically receive purchased items from the fulfillment system using a different medium than used to purchase the items.

Methods and systems consistent with the present invention also provide consumers an interface associated with a remote device to facilitate purchasing purchasable items. A consumer may select a displayed item on the consumer interface to purchase. For example, a consumer may select digital songs or software to be delivered. A client device, capable of receiving and using the items, receives the purchasable items.

Figure 1:
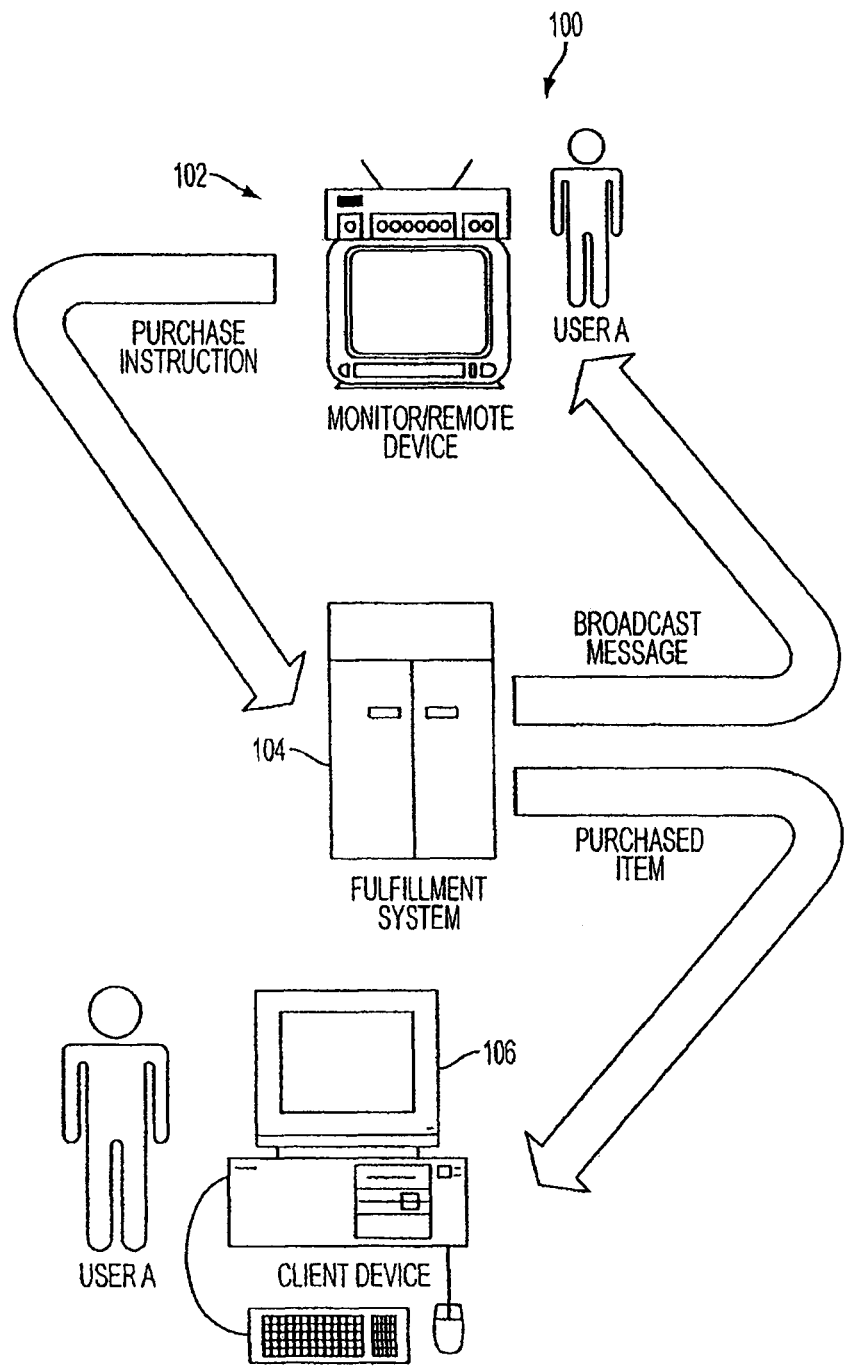
FIG. 1 is a schematic representation of the architecture of a network in a manner consistent with the principle of the present invention.

FIG. 1 shows a block diagram of the architecture of a cross channel fulfillment system 100 in a manner consistent with the principles of the present invention. System 100 contains a remote device 102, fulfillment system 104, and a client device 106. Remote device 102 enables consumers to view purchasable items using a video display, such as a television monitor, and select purchasable items using an input device, such as an infrared controller. Remote device 102, placed at a consumer location, receives broadcast messages from fulfillment system 104 and transmits purchase instructions to fulfillment system 104 using any broadcast medium, such as radio waves. A purchase instruction may include information, such as purchase information (e.g., PIN number, credit cards), delivery information (e.g., e-mail address), and/or information identifying the items to purchase (e.g., SKU). The purchase information, along with a remote device identification, is transmitted to fulfillment system 104 for processing. Remote device 102 also contains a caching mechanism for storing recently received broadcast messages in case the consumer does not initially see or hear the broadcast message. In addition remote device 102 may transmit the purchase information realtime, periodically on a scheduled basis, or when polled by fulfillment system 104.

When a purchase instruction is received at fulfillment system 104, the system determines if the instruction is valid. To do so, the system locates, in various connected databases, records associated with the consumer. The records may include a remote device identification, a consumer identification, a PIN number, an e-mail address, and a payment identifier. System 104 cross references the remote device identification with the delivery information and payment information.

If the delivery information or payment information is incomplete or faulty, system 104 transmits a message to remote device 102 prompting a valid completion. Otherwise, the order is considered valid, and the item may be electronically sent to the consumer in a medium specified by the consumer when placing the order (e.g., e-mail delivery).

The cross channel fulfillment system provides a number of benefits over traditional electronic ordering systems. First, the fulfillment system broadcasts information corresponding to purchasable items to a plurality of consumers. This simple approach enables the fulfillment system to make many offers to many consumers at the same time. Unlike traditional delivery systems where the consumer initiates the shopping session, the fulfillment system provides information relating to purchasable items to consumers without any consumer interaction. Moreover, by broadcasting the information, a consumer may first see (or listen) to the purchasable item before deciding whether to purchase it. That is, since the remote device stores the broadcasted information for a period of time (e.g., in cache) after the broadcast, a consumer unable to initially view the broadcast may still purchase the items. Second, the system manages multiple transmission mediums from a centralized location (e.g., Internet, cable, satellite). Any updates to the remote devices, or new transmission mediums for delivery are easily implemented at the centralized location instead of having to individually upgrade each remote device that converges multiple transmission mediums. A centralized database maintains all transmission mediums, including which consumers may use which mediums for delivery. Third, the fulfillment system easily implements non-real time back channel delivery to a consumer's location. That is, if there is excessive load at the time a consumer transmits a purchase instruction to the fulfillment system, the system delivers the purchased items at a later time. Since the delivery may be on a transmission medium different from the medium used to order the item, the fulfillment system can take advantage of the non-real time fulfillment.

Finally, the fulfillment system links consumer records in a centralized location. This helps minimize outstanding consumer records for various transmission mediums since the system maintains a database that can be used to cross reference the transmission mediums.

System Architecture and Operation

Figure 2A:
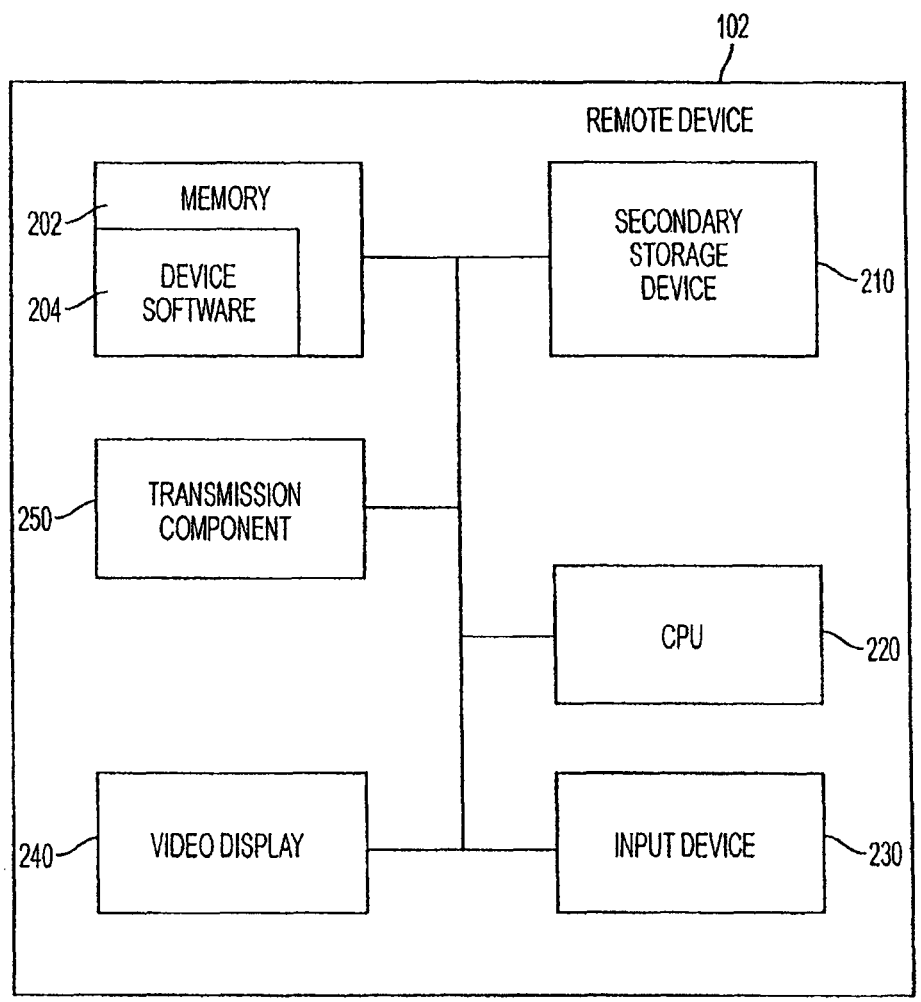
FIG. 2A depicts a more detailed diagram of the remote device depicted in FIG. 1.

FIG. 2A depicts a more detailed diagram of remote device 102, which contains a memory 202, a secondary storage device 210, a CPU 220, an input device 230, a video display 240, and a transmission component 250. Memory 202 contains device software 204 that enables a consumer to send instructions to fulfillment system 104. An instruction may be a request to purchase digital items, such as the digital version of books or music. Secondary storage device 210 contains unique identification information that identifies remote device 102, such as an identification number and other information identifying the consumer. Transmission component 250 communicates with fulfillment system 104 by receiving broadcast messages and sending purchase instructions. For example, transmission component 250 may communicate with fulfillment system 104 using radio waves. One skilled in the art will appreciate that remote device 102 may be composed of separate components, such as a set-box for a television, decoder device, and a storage device (e.g., external hard drive, or network storage device).

Figure 2B:
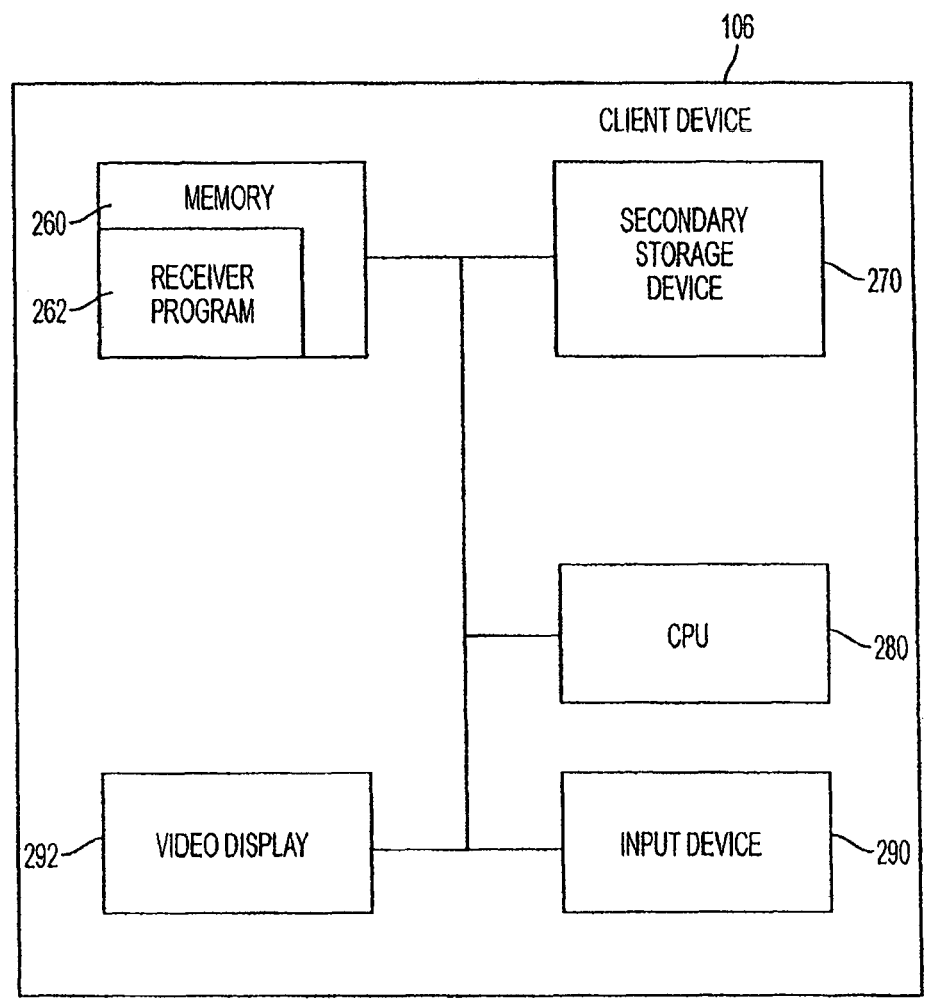
FIG. 2B depicts a more detailed diagram of the client device depicted in FIG. 1.

FIG. 2B depicts a more detailed diagram of a client device 106, which contains a memory 260, a secondary storage device 270, a central processing unit (CPU) 280, an input device 290, and a video display 292. Memory 260 includes a receiver program 262 that allows a consumer to receive digital items in a different transmission medium different from the transmission medium used for the broadcast message. For example, a receiver program 262 may be an e-mail program, such as the Eudora e-mail client, from Eudora.

Figure 3:
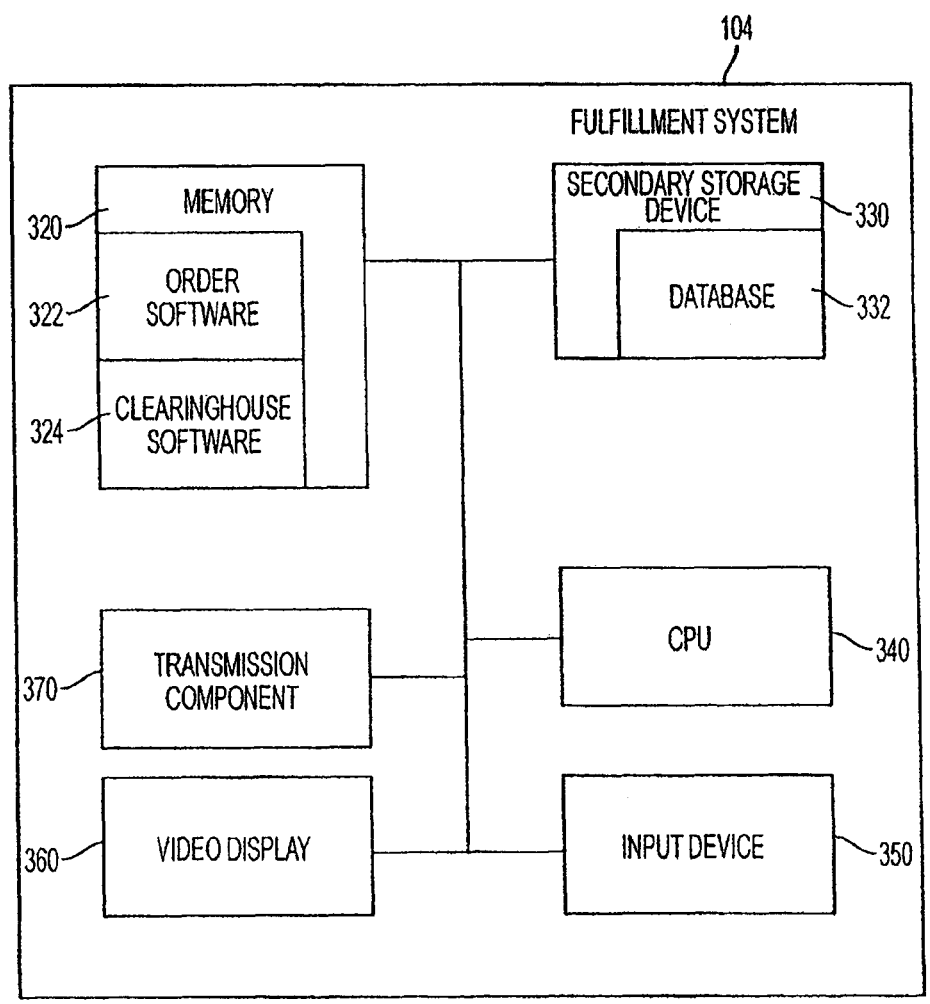
FIG. 3 depicts a more detailed diagram of the fulfillment system depicted in FIG. 1.

As shown in FIG. 3, fulfillment system 104 includes a memory 320, a secondary storage device 330, a CPU 340, an input device 350, a video display 360, and a transmission component 370. Memory 320 includes order software 322 and clearing house software 324. Order software 322 determines whether the consumer is authorized to purchase the purchasable item. Clearinghouse software 324 cross references remote device identifications with consumer delivery information as well as payment information. Clearinghouse software also transmits purchasable items to client device 106. Secondary storage device 330 contains a database 332 that correlates information associated with each consumer, such as remote device 102 information and client device 106 information, further described below. Transmission component 370 transmits broadcast messages to and receives purchase instructions from a remote device 102.

Figure 4:
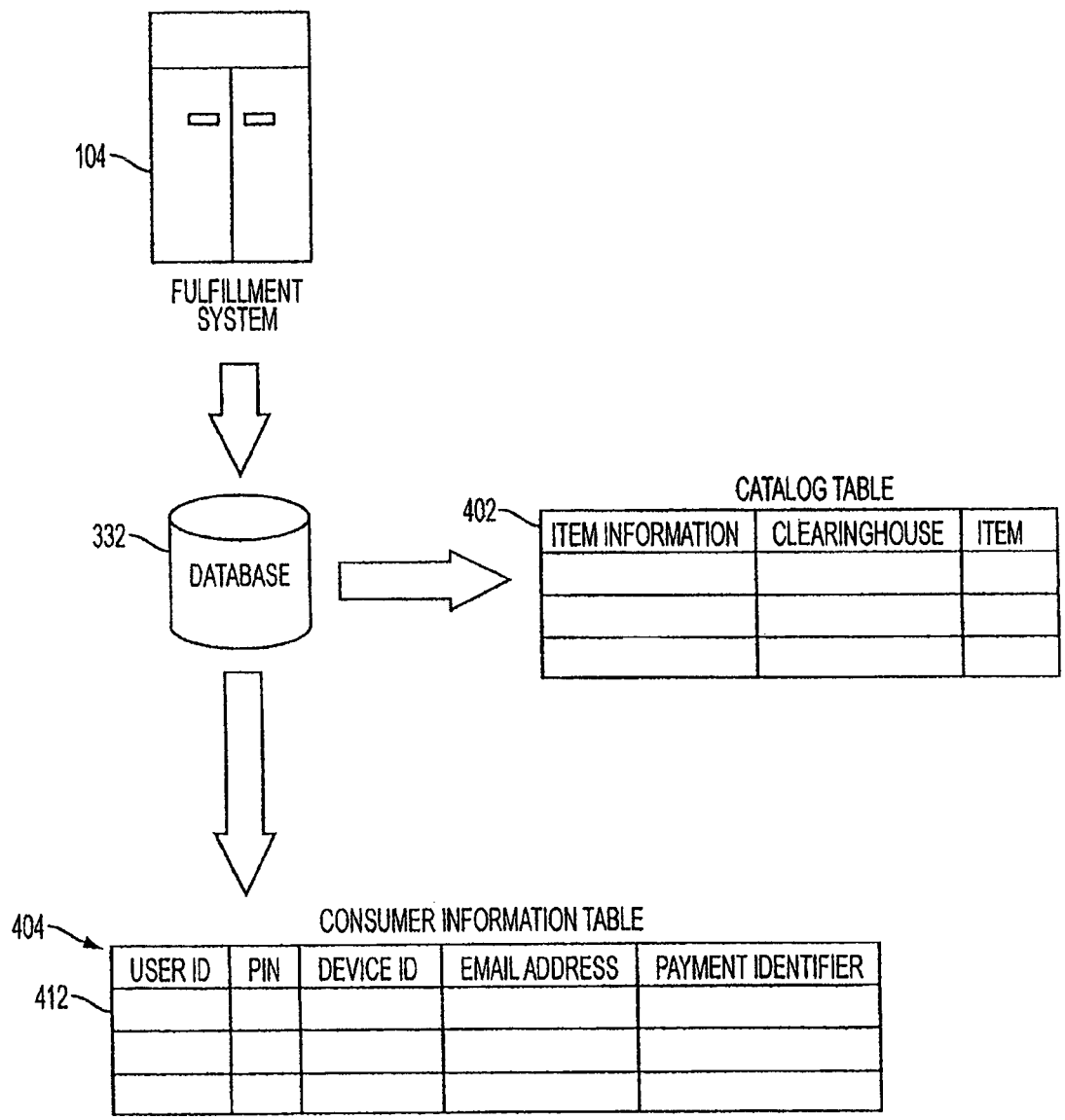
FIG. 4 illustrates a fulfillment system and its relationship to a database in a manner consistent with the principles of the present invention.

As shown in FIG. 4, database 332 contains a catalog information table 402 and a consumer information table 404. Catalog information table 402 contains information associated with all purchasable items, such as a unique identification number, purchasable item name, and a digital representation of the purchasable item Consumer information table 404 contains consumer information corresponding to consumers able to purchase items. For example, a consumer may be able to purchase items if the consumer has previously registered with fulfillment system 104. In such a case, consumer information table 404 may indicate so. A consumer may register with fulfillment system 104 by submitting billing, payment, and identification information (e.g., PIN). A record 412 includes for each consumer: a consumer identification; a PIN; a remote device identification; delivery information (e.g., e-mail address); and a payment information (e.g., credit card) One skilled in the art will appreciate that tables 402, 404 may contain additional information, and may be located in multiple databases. For example, an Internet Service Provider (ISP) may contain information relating to the delivery information, whereas a cable operator may contain information relating to payment information and consumer information.

Figure 5:
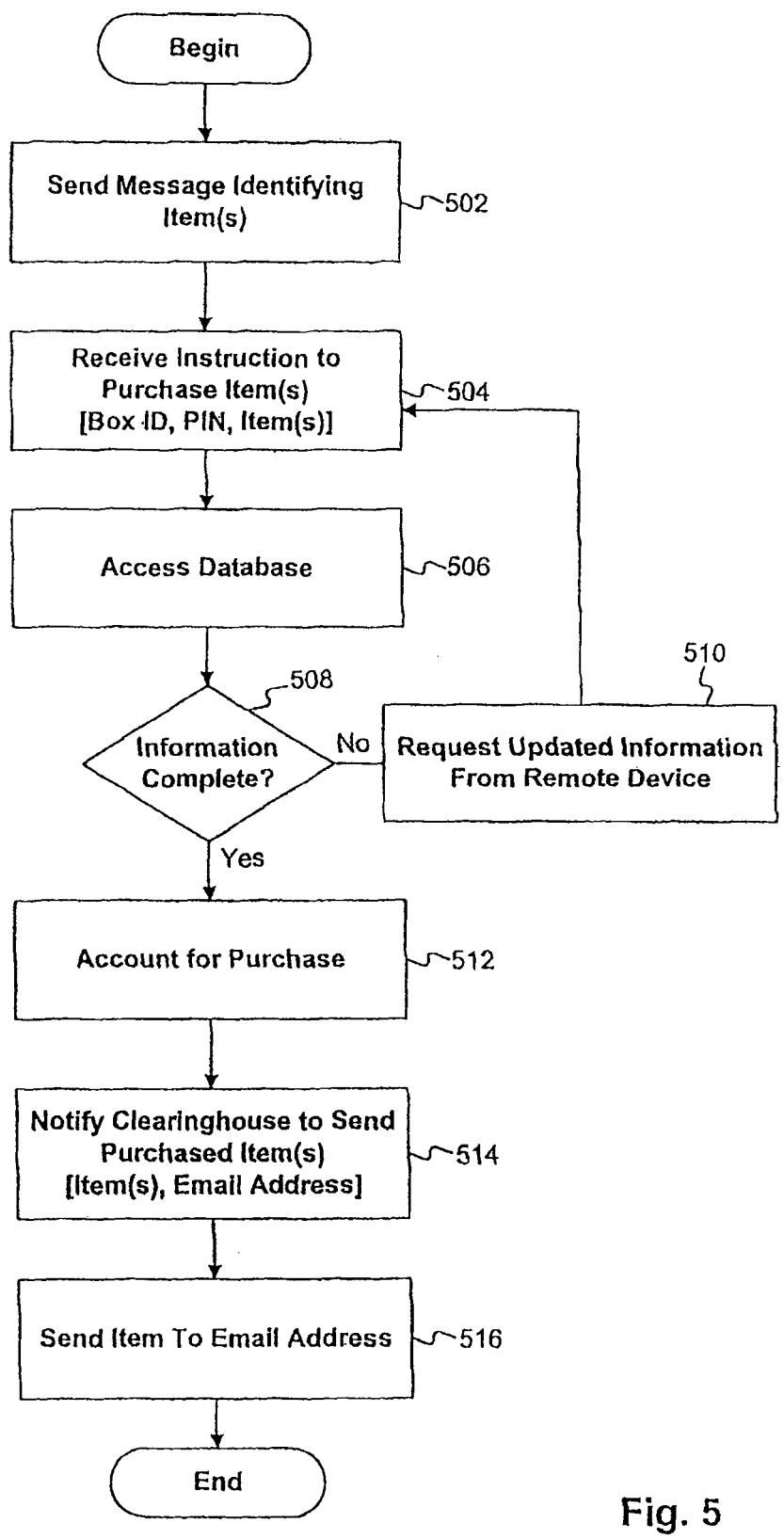
FIG. 5 depicts a flow chart of the steps performed by the fulfillment system of FIG. 1 in a manner consistent with the principles of the present invention.

FIG. 5 depicts a flow chart of the steps performed by fulfillment system 104. First, fulfillment system 104 transmits a broadcast message identifying purchasable items to a remote device 102 (step 502). Fulfillment system 104 uses transmission component 370 to communicate with remote device 102. In response, if a consumer purchases an item, fulfillment system 104 receives a purchase instruction (step 504). The instruction may include a remote device 102 identification, a consumer PIN, a list of items purchased by the consumer, and a delivery instruction. The instruction may be sent in a transmission medium similar to the broadcast in step 502.

Once fulfillment system 104 receives the instruction, fulfillment system 104 then accesses database 332 to verify the purchase instruction (step 506). Fulfillment system 104 locates a record 412 that corresponds to the consumer identification. Fulfillment system 104 checks if consumer supplied PIN corresponds to the PIN listed in record 412 (step 508). If the PINs do not match, or if there is other incomplete information (e.g., missing PIN, payment information, or items) fulfillment system 104 may transmit a message to remote device 102 requesting reverification and/or updated information (step 510). However, if the PINs match, fulfillment system 104 first accounts for the purchase (step 512). To account for the purchase, fulfillment system 104 may perform a bulling function, such as charging the consumer's credit card, or creating a billing record to send to the consumer.

Once the purchase is accounted for, order software 322 may notify clearinghouse software 324 to transmit the item to the consumer using the delivery method indicated in the purchase instruction (step 514). The notification may contain an item identification and a consumer identification. In most instances, the delivery method will be a transmission medium different from the transmission medium used for the broadcast message. Once clearinghouse software 324 receives the notification, clearinghouse software 324 may access database 332 to locate a delivery address and transmits the item to client device 106 (step 516).

Figure 6:
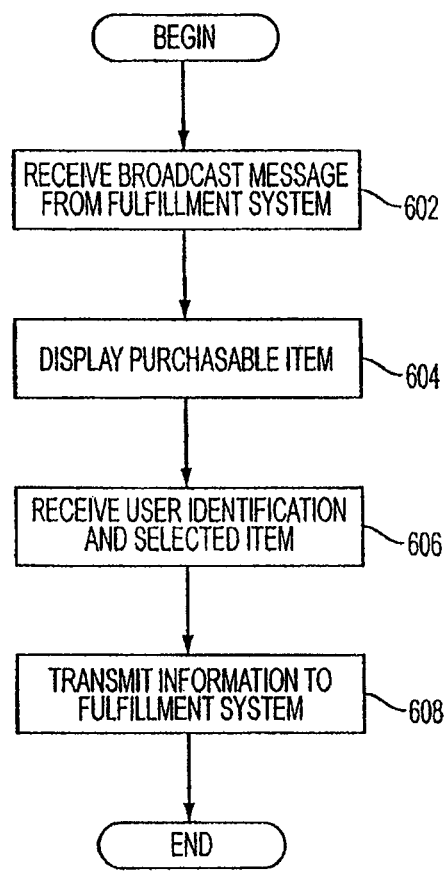
FIG. 6 depicts a flow chart of the steps performed by remote device of FIG. 1 in a manner consistent with the principles of the present invention.

FIG. 6 depicts a flow chart of the steps performed by remote device 102. First, remote device 102 receives a broadcast message from fulfillment system 104 (step 602). The broadcast message contains information identifying a purchasable item as well as the purchasable item itself. For example, in the case of music, the broadcast message may include a single track from a CD as well as the CD identification (e.g., SKU number). This way, the consumer may first listen to the CD and, if the consumer decides to purchase the CD, may do so by using the CD identification to create a purchase instruction. If however, the consumer does not immediately access remote device 102, the broadcast message may be stored for a predetermined period of time in memory 202 of remote device 102. This way, the consumer may access the broadcast message at a later period.

If the consumer decides to purchase the purchasable item, remote device 102 transmits a response to the broadcast message to fulfillment server 104, as described above. Once received at fulfillment server 104, remote device 102 may display the purchasable item on video display 260 (step 604). For example, the broadcast message may be an audio clip from a CD, or a textual message describing a digital book. The message may be stored in secondary storage device 210 so that the consumer may later purchase a purchasable item. If the consumer purchases an item, remote device 102 receives the consumer's PIN number, and an item identification (step 606). Next, remote device 102 transmits the consumer information, identification of the selected item to be purchased, and remote device 102 identification information as a purchase instruction to fulfillment system 104 (step 608). In doing so, fulfillment system 104 may then determine if the purchase instruction is complete and complete the purchase.

CONCLUSION

As explained, systems consistent with the present invention overcome the shortcomings of existing systems by providing a cross channel fulfillment system that enables consumers to purchase and receive items using different transmission mediums.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network like the Internet; or other forms of ROM or RAM. Additionally, although specific components and programs of various computers and various servers have been described, one skilled in the art will appreciate that these may contain additional or different components or programs.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems.

What is claimed is:
1. A method, comprising:
   transmitting information identifying an item, wherein the information is transmitted by a transmitter such that the information is received at the same time at a first communication device and at a second communication device, wherein the first communication device is operable to (i) use the transmitted information to present information about the item to a user of said first communication device, (ii) receive from the user input indicating the user's desire to acquire the item, and (iii) transmit a request message requesting the item to a remote system remote from said first communication device after receiving the input from the user, said remote system comprising a receiver and a processing apparatus;

receiving the transmitted request message using said receiver;

processing, by the processor, the request message to identify the requested item so as to locate a file containing the requested item; and as a result locating a file containing the requested item, transmitting, from the remote system and via a communications network, said file containing the requested item to a third communication device that is separate from said first communication device, wherein said separate third communication device is operable to (i) receive the transmitted file and (ii) store the file in a storage unit of said separate third communication device automatically in response to receiving the file, wherein the request message comprises a device identifier identifying said first communication device and said step of processing the request message comprises using said device identifier to retrieve a previously stored delivery address, which delivery address is associated with the device identifier, and the step of transmitting the file to the third communication device comprises transmitting the file to the delivery address, the first communication device is a set-top box, and the third communication device is not a set-top box, but is one of a server device or a client device.

2. The method of claim 1, wherein the request message includes a delivery instruction indicating a delivery method.

3. The method of claim 1, further comprising the step of maintaining at the remote system information associating each said first and third communication devices with at least one user.

4. The method of claim 1, further comprising the step of maintaining at the remote system information associating said first communication device with said third communication device.

5. The method of claim 1, wherein the step of processing the request message includes determining whether the user is permitted to acquire the item.

6. The method of claim 5, wherein the determining step includes the step of accessing payment information associated with the user using a user identifier associated with the user.

7. The method of claim 6, wherein the user identifier is included in the request message transmitted to the remote system.

8. The method of claim 1, wherein said first communication device maintains a set of previously broadcasted information for a predetermined period of time.

9. The method of claim 1, wherein the information is transmitted using a cable television network.

10. The method of claim 1, wherein the information is transmitted using an IP enabled transmission network.

11. The method of claim 1, wherein the information is transmitted using a wireless communication network.

12. The method of claim 1, wherein the step of transmitting the file containing the item from the remote system to the third communication device comprises transmitting the file immediately after processing the request message.

13. The method of claim 1, wherein the step of transmitting the file containing the item from the remote system to the third communication device comprises transmitting the file a later time after processing the request message.

14. The method of claim 1, wherein the step of transmitting the file containing the item from the remote system to the third communication device comprises transmitting the file by electronic mail.

15. The method of claim 1, further comprising the step of transmitting the file containing the item from the remote system to a fourth communication device in response to processing the message, wherein the fourth communication device is different than said third communication device and said first communication device that transmitted the request message to the remote system.

16. The method of claim 1, wherein the third communication device implements an e-mail server.

17. A system, comprising:

a first communication device comprising: a first transmitter, a first receiver, a first processing apparatus, and a display;

a second communication device that is separate from said first communication device; and a remote system located remotely from the first communication device, the remote system comprising: a second transmitter; a second receiver; and a second processing apparatus, wherein the second processing apparatus is configured to employ the second transmitter to transmit information identifying an item such that the information is received at the same time at the first communication device and at a third communication device, the first processing apparatus is configured to (i) employ the transmitted information to present information about the item on said display and (ii) employ the second transmitter to transmit a request message to the remote system remote from said first remote device as a result of receiving from a user of the first communication device an input indicating the user's desire to acquire the item, the second processing apparatus being further configured to process the request message to identify the requested item, locate a file containing the requested item, and employ the transmitter to transmit, via a communications network, said file containing the item to the second communication device as a result of processing the request message, and said second communication device is operable to (i) receive the transmitted file and (ii) store the file in a storage unit of said second communication device automatically in response to receiving the file, wherein the request message comprises a device identifier identifying said first communication device and said step of processing the request message comprises using said device identifier to retrieve a previously stored delivery address, which delivery address is associated with the device identifier, and the step of transmitting the file to the second communication device comprises transmitting the file to the delivery address the first communication device is a set-top box, and the second communication device is not a set-top box, but is one of a server device and a client device.

18. The system of claim 17, wherein the request message includes a delivery instruction indicating a delivery method.

19. The system of claim 17, further comprising a data store for storing information associating said first communication device with said third communication device.

20. The system of claim 17, wherein the second communication device comprises an e-mail server.

* * * * *